United States Patent [19]
Showalter

[11] Patent Number: 6,062,361
[45] Date of Patent: May 16, 2000

[54] ACCELERATION SENSITIVE DOUBLE OVERRUNNING CLUTCH

[75] Inventor: Dan J. Showalter, Plymouth, Mich.

[73] Assignee: Borg-Warner Automotive, Inc., Troy, Mich.

[21] Appl. No.: 09/185,478

[22] Filed: Nov. 3, 1998

[51] Int. Cl.[7] .................................................. F16D 3/34
[52] U.S. Cl. ............................... 192/38; 192/35; 74/335
[58] Field of Search .................................. 192/46, 48.92, 192/51, 48.6; 180/233; 475/303; 74/335

[56] References Cited

U.S. PATENT DOCUMENTS

| | | | |
|---|---|---|---|
| 2,096,438 | 10/1937 | Rockwell | 192/48 |
| 3,295,625 | 1/1967 | Ordorica et al. | 180/44 |
| 3,300,002 | 1/1967 | Roper | 192/35 |
| 3,437,186 | 4/1969 | Roper | 192/35 |
| 3,584,713 | 6/1971 | Tani et al. | 192/38 |
| 4,044,870 | 8/1977 | Fogelberg | 192/89 W |
| 4,076,108 | 2/1978 | Fogelberg | 192/35 |
| 4,083,419 | 4/1978 | Fogelberg | 180/44 R |
| 4,083,440 | 4/1978 | Silberschlag | 192/3.31 |
| 4,098,379 | 7/1978 | Fogelberg et al. | 192/38 |
| 4,103,753 | 8/1978 | Holdeman | 180/49 |
| 4,114,746 | 9/1978 | Usui et al. | 192/104 R |
| 4,119,168 | 10/1978 | Fogelberg | 180/49 |
| 4,132,297 | 1/1979 | Brown et al. | 192/36 |
| 4,184,575 | 1/1980 | Fogelberg | 192/36 |
| 4,185,723 | 1/1980 | Kelbel | 192/36 |
| 5,036,939 | 8/1991 | Johnson et al. | 180/233 |
| 5,195,604 | 3/1993 | Brockett et al. | 180/248 |
| 5,782,328 | 7/1998 | Fogelberg et al. | 192/35 |
| 5,884,526 | 3/1999 | Fogelberg | 74/335 |

*Primary Examiner*—Charles A. Marmor
*Assistant Examiner*—Tisha D. Waddell
*Attorney, Agent, or Firm*—Brinks, Hofer, Gilson & Lione; Greg Dziegielewski

[57] ABSTRACT

An acceleration sensitive double overrunning clutch is directionally preset by a change in speed, i.e., acceleration, rather than relative rotation. The clutch is especially adapted for use in power transmission devices such as motor vehicle transfer cases. The clutch includes a plurality of rollers disposed in a like plurality of spaces having symmetrically arranged oblique walls formed by adjacent portions of an inner member and a concentric outer member. The rollers are arranged within a spacing cage which is coupled to an annular weight. A speed change, i.e., acceleration or deceleration, shifts the weight and presets the cage and rollers to function in their engaged or overrunning modes in one direction or the other depending upon the direction of such acceleration.

28 Claims, 3 Drawing Sheets

6,062,361

ACCELERATION SENSITIVE DOUBLE OVERRUNNING CLUTCH

BACKGROUND OF THE INVENTION

The invention relates generally to a double overrunning clutch for use in power transmission devices and more particularly to an acceleration sensitive double overrunning clutch for use in motor vehicle drive lines.

The benefits of improved traction and vehicle control achieved by four-wheel drive systems in adverse driving and weather conditions such as snow, freezing rain, ice and even water has been known and appreciated by vehicle designers for many years. However, it is frequently argued that the weight and expense of providing an additional, secondary drive line having reliability equal to the primary drive line which is necessitated by its full time operation cannot be justified from the standpoint of the frequency such adverse driving conditions are encountered. These considerations often are satisfied by systems which operate part-time or on an as needed basis. Such systems may be significantly less rugged, weigh less and cost less inasmuch as they may be utilized only intermittently.

One of the less complex, part-time four wheel drive systems incorporates a simple mechanical one-way overrunning clutch between the primary drive line and secondary drive line. When the primary drive line attempts to overspeed the secondary drive line as will occur during an incipient skid caused by the application of drive torque exceeding the tire to road surface frictional coupling, the one-way clutch engages and transfers drive torque to the secondary drive wheels, thereby achieving four-wheel drive only under circumstances requiring it.

The use of a one way overrunning clutch to selectively provide drive torque to a secondary drive line upon primary wheel slip has not, however, become a popular solution to part-time four-wheel drive vehicles requirements and issues because of one problem: the clutch remains disengaged or inactive when reverse gear is selected unless, of course, the secondary drive line attempts to overspeed the primary drive line. Thus, in a situation frequently requiring four-wheel drive, that is, when the vehicle may need to be rocked or simply backed over terrain, a four-wheel drive configuration utilizing a one-way overrunning clutch will simply not provide four-wheel drive operation. This is a significant drawback of this clutch configuration.

One proposed solution to this difficulty comprehends the use of a double overrunning clutch. Here, a clutch configuration having a plurality of generally symmetrical roller receiving chambers formed by concentric drive and driven members also includes a cage and associated drag member which pre-stages or presets the roller in a forward or reverse direction. So staged or preset, the device functions to engage and release in response to drive or overrunning in the staged or preset direction, much as a one-way overrunning clutch would do. Operation, particularly engagement, of such double overrunning clutches, however, can be abrupt and questions have been raised with regard to customer satisfaction based upon occupant perception of clutch engagement and disengagement.

It is apparent, therefore, that improvements in the art of fully mechanical, selectively operating four-wheel drive systems utilizing double overrunning clutches are both desirable and possible.

SUMMARY OF THE INVENTION

An acceleration sensitive double overrunning clutch is directionally preset by a change in speed, i.e., acceleration, rather than relative rotation. The clutch is especially adapted for use in power transmission devices such as motor vehicle transfer cases. The clutch includes a plurality of rollers disposed in a like plurality of chambers having symmetrically arranged oblique walls formed by adjacent portions of an inner member and a concentric outer member. The rollers are arranged within a spacing cage which is coupled to an annular weight by a plurality of radial spring arms which provide a centering or restoring force. A speed change, i.e., acceleration or deceleration, shifts the weight and presets the cage and rollers to function in their engaged or overrunning modes in one direction or the other depending upon the direction of such acceleration.

An alternate embodiment of the invention comprehends the above described clutch disposed in mechanical parallel with a disc pack clutch having a preset level of frictional coupling achieved by a compression spring such as a Belleville washer disposed adjacent the clutch pack.

It is thus an object of the present invention to provide an acceleration sensitive double overrunning clutch.

It is a further object of the present invention to provide a mechanically parallel acceleration sensitive double overrunning clutch and disc pack clutch assembly with a preset torque throughput for use in motor vehicle transfer cases.

It is a still further object of the present invention to provide a double overrunning clutch which is sensitive to and engages in response to acceleration and deceleration rather than speed differences.

It is a further object of the present invention to provide a mechanically parallel acceleration sensitive double overrunning clutch and disc pack clutch assembly with a preset torque throughput for use in motor vehicle transfer cases.

Further objects and advantages of the present invention will become apparent by reference to the following description and appended drawings wherein like reference numbers refer to the same component, element or feature.

DESCRIPTION OF THE PREFERRED AND ALTERNATE EMBODIMENTS

Figure 1:
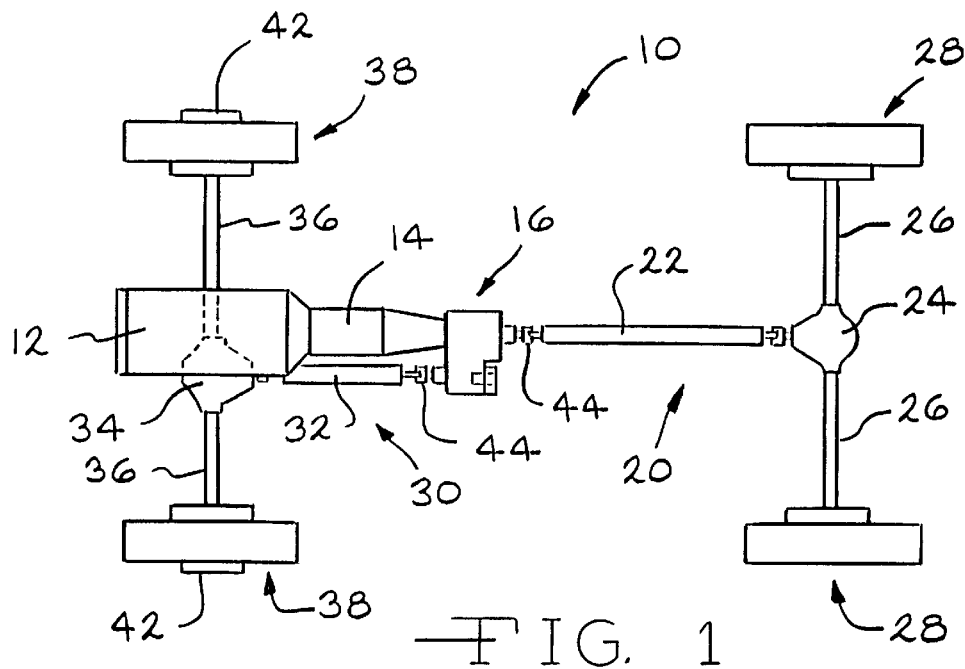
FIG. 1 is a diagrammatic plan view of a four-wheel drive motor vehicle powertrain having a transfer case incorporating the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear propeller shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front propeller shaft 32, a secondary or front differential assembly 34, a pair of live secondary or front axles 36 and a respective pair of secondary or front tire and wheel assemblies 38. The front tire and wheel assemblies 38 are preferably directly coupled to a respective one of the pair of front axles 36. Alternately, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

The foregoing and following description relates to is a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
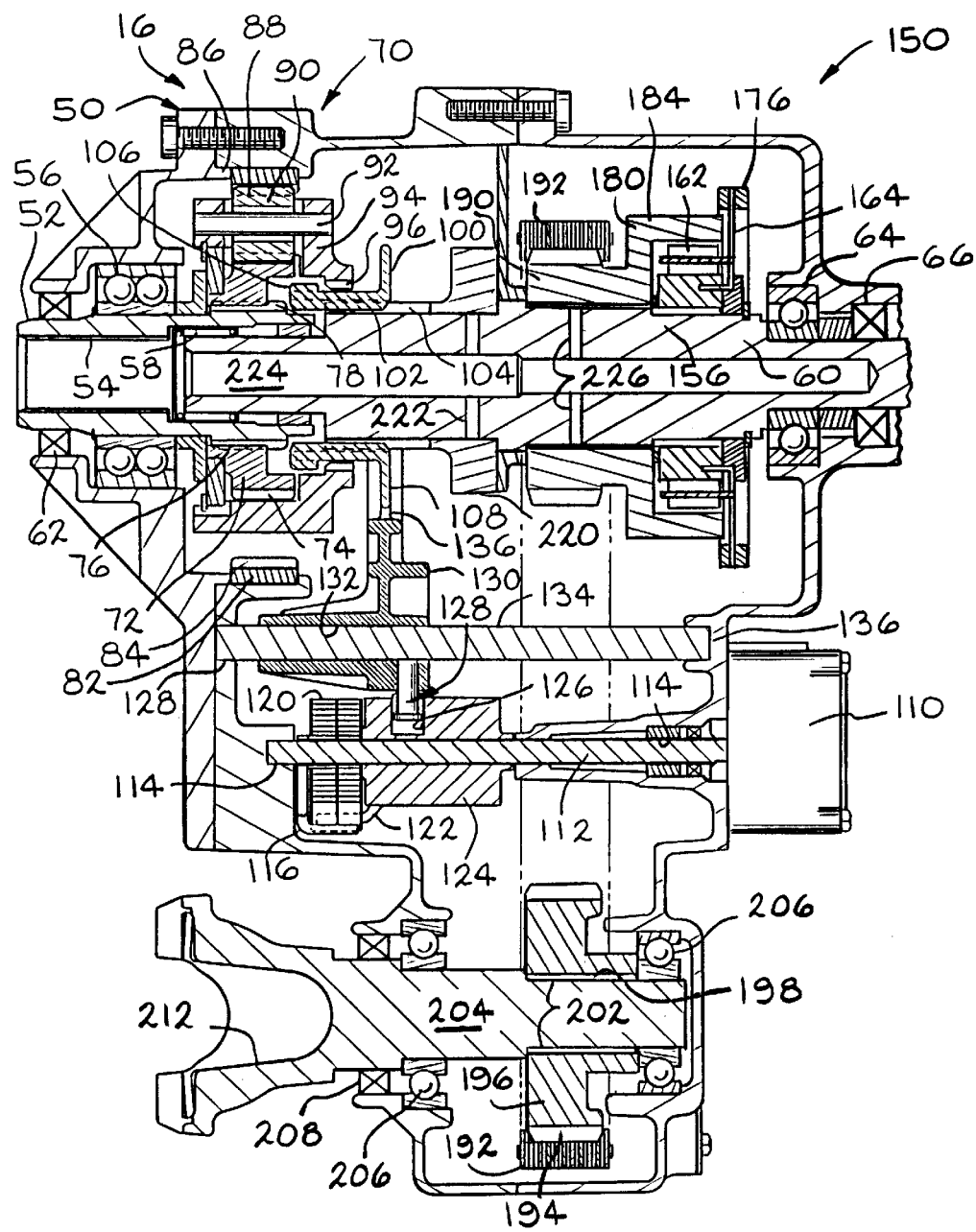
FIG. 2 is a full, sectional view of a motor vehicle transfer case incorporation the acceleration sensitive double overrunning clutch according to the present invention.

Referring now to FIGS. 1 and 2, the transfer case assembly 16 incorporating the present invention includes a multiple piece housing assembly 50 having planar and circular sealing surfaces, openings for shafts and bearings and various recesses, shoulders, flanges, counterbores and the like to receive various components or assemblies of the transfer case 16. An input shaft 52 includes female or internal splines or gear teeth 54 or other suitable structure which drivingly couple the output of the transmission 14 illustrated in FIG. 1 to the input shaft 52. The input shaft 52 is rotatably supported at one end by an anti-friction bearing such as the ball bearing assembly 56 and at its opposite end by an internal anti-friction bearing such as the roller bearing assembly 58. The roller bearing assembly 58 is disposed upon a portion of a stepped primary output shaft 60. A suitable oil seal 62, positioned between the input shaft 52 and the housing assembly 50, provides an appropriate fluid tight seal therebetween. The opposite end of the primary output shaft 60 is supported by an anti-friction bearing such as the ball bearing assembly 64 and may include a flange or similar structure (not illustrated) which may be coupled to the universal joint 44 or may be secured to associated drive line components such as the primary propeller shaft 22. A suitable oil seal 66, disposed between the primary output shaft 60 and the housing assembly 50, provides an appropriate fluid tight seal therebetween.

Referring now to FIG. 2, the transfer case assembly 16 includes a two-speed planetary gear drive assembly 70 disposed about the input shaft 52. The planetary drive assembly 70 includes a sun gear 72 having a plurality of male gear teeth 74 and a plurality of female splines or gear teeth 76 which engage a complementary plurality of male splines or gear teeth 78 on the input shaft 52 having greater axial length than the sun gear 72. The sun gear 72 is thus coupled to the input shaft 52 and rotates therewith. Radially aligned with the sun gear 72 and its teeth 74 is a ring gear 82 having internal or female gear teeth 84. The ring gear 82 is retained within the housing assembly 50 by any suitable retaining structure such as a projection or lip 86 formed on portions of the housing assembly 50. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of female or internal splines or gear teeth 96 disposed generally adjacent the male splines or gear teeth 78 on the input shaft 52. The planetary gear assembly 70 is more fully described in co-owned U.S. Pat. No. 4,440,042 which is herein incorporated by reference.

The planetary drive assembly 70 also includes a dog clutch or clutch collar 100 defining elongate female or internal splines or gear teeth 102 which are axially aligned with and, in all respects, complementary to the male splines or gear teeth 78 on the input shaft 52. The clutch collar 100 and its internal splines or gear teeth 102 are slidably received upon a complementary plurality of male or external splines or gear teeth 104 on the primary output shaft 60. The clutch collar 100 thus rotates with the primary output shaft 60 but may translate bi-directionally therealong. The clutch collar 100 also includes male or external splines or gear teeth 106 on one end which are in all respects complementary to the female splines or gear teeth 96 on the planet carrier 94. The opposite end of the clutch collar 100 defines a circumferentially extending flange 108.

The clutch collar 100 is capable of three positions and operational modes. In FIG. 2, the clutch collar 100 is illustrated in its center or neutral position. In the center, neutral position the input shaft 52 is disconnected from the primary output shaft 60 and no power is transmitted therebetween. When the clutch collar 100 is moved to the left from the position illustrated in FIG. 2, direct drive is achieved wherein the internal splines or gear teeth 102 of the clutch collar 100 engage the external splines or gear teeth 78 on the input shaft 52 thereby directly coupling the input shaft 52 to the output shaft 60 and providing direct or high gear drive therebetween. When the clutch collar 100 is moved to the right from the position illustrated in FIG. 2, the speed reduction achieved by the planetary gear assembly 70 is engaged through engagement of the external splines or gear teeth 106 on the clutch collar 100 with the internal splines or gear teeth 96 on the carrier 94 of the planetary gear assembly 70. So engaged, the planetary gear assembly 70 is active and provides a speed reduction, typically in the range of from 3:1 to 4:1 between the input shaft 52 and the primary output shaft 60.

The position of the clutch collar 100 is commanded by an electric shift control motor 110. The shift control motor 110 rotates a drive shaft 112 which is supported for rotation in the housing assembly 60 by bushings or bearings 114.

The drive shaft 112 terminates in an L-shaped arm 116 which is coupled to one end of a spiral spring assembly 120. The spring assembly 120 is wrapped about the drive shaft 112. The other end of the spring assembly 120 is coupled to an extension 122 which projects generally axially and couples the spring assembly 120 to a cylindrical cam 124.

The spring assembly 120 functions as a resilient, energy storing connection between the drive shaft 112 and the cylindrical cam 124 to absorb differences between the movement commanded by the shift control motor 110 and the clutch collar 100 so that the shift motor 110 may reach its final commanded position regardless of the position of the clutch collar 100.

The cylindrical cam 124 defines a helical cam path or track 126 which extends obliquely about the cylindrical cam 124. The helical track 126 receives a pin and cam follower assembly 128 which is coupled to and translates a shift fork assembly 130. The shift fork assembly 130 includes a through bearing aperture 132 which receives and supports the fork assembly 130 on a fixed shaft 134 for bi-directional translation. The shift fork assembly 130 includes a semi-circular yoke 136 which engages the flange 108 of the clutch collar 100. Rotation of the drive shaft 112 axially repositions the cam follower assembly 128 into one of the three positions described above. The spring assembly 120 allows smooth and fast response to commanded repositioning of the clutch collar 100 in situations where the internal splines or gear teeth 102 of the clutch collar 100 do not instantaneously engage the external splines or gear teeth 78 of the input shaft 52 or the external splines or gear teeth 106 of the clutch collar 100 do not instantaneously engage the splines or gear teeth 96 of the carrier 94. When rotation of the input shaft 52 or the carrier 94 allows engagement of the aforementioned clutch teeth, energy stored in the spring assembly 120 rotates the cylindrical cam 124 to its requested position, thus completing the shift.

It will be appreciated that the planetary gear assembly 70 including the drive mechanism of the clutch collar 100, which provides dual range, i.e., high and low speed, capability to the transfer case assembly 16 is optional and that the present invention is fully functional and may be utilized without these components and the dual speed range capability provided thereby.

Figure 3:
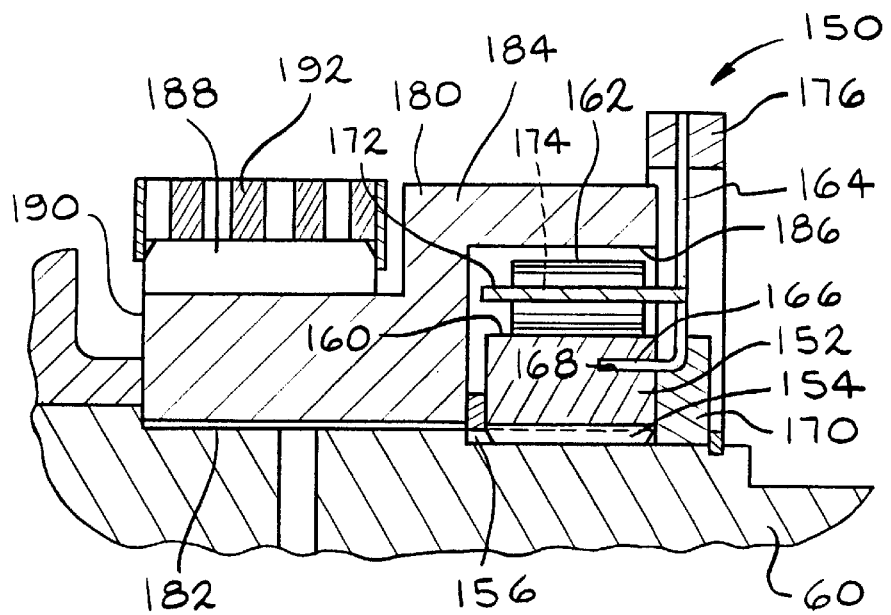
FIG. 3 is an enlarged, full, sectional view of an acceleration sensitive double overrunning clutch according to the present invention.

Referring now to FIGS. 2 and 3, the transfer case assembly 16 also includes an acceleration sensitive double overrunning clutch assembly 150. The acceleration sensitive double overrunning clutch assembly 150 includes a drive annulus 152 which includes a plurality of internal splines or gear teeth 154 which are drivingly received upon a complementarily configured set of male splines or gear teeth 156 disposed on the primary output shaft 60. The drive annulus 152 defines a plurality of external chordal flats or surfaces 160. Preferably associated with each of the chordal flats or surfaces 160 is one of a plurality of cylindrical clutch rollers 162. Secured to the annular drive member 152 and rotating therewith are a plurality of radial spring arms 164. The spring arms 164 include axially extending portions 166 which are received within blind, complementarily configured passageways 168 formed in the drive annulus 152. The axially extending portions 166 may either be secured in the passageways 168 or retained there by a retaining collar 170.

Also extending axially and circumferentially about the drive annulus 152 and secured to the spring arms 164 is a roller cage 172. The spring arms 164 provide bi-directional biasing or restoring force to the roller cage 172 which urge it to the position illustrated in FIG. 4. The roller cage 172 defines an annulus having a diameter which corresponds to the nominal circle defined by the centers of the rollers 162 and defines a plurality of rectangular openings 174 which receive and circumferentially and axially position each of the clutch rollers 162. Secured to the radially outwardly disposed termini of each of the spring arms 164 is an annular weight 176. The annular weight 176 may be any relatively dense material which is secured to the termini of the spring arms 164 by any suitable means such as swaging, welding or a friction fit.

Figure 4:
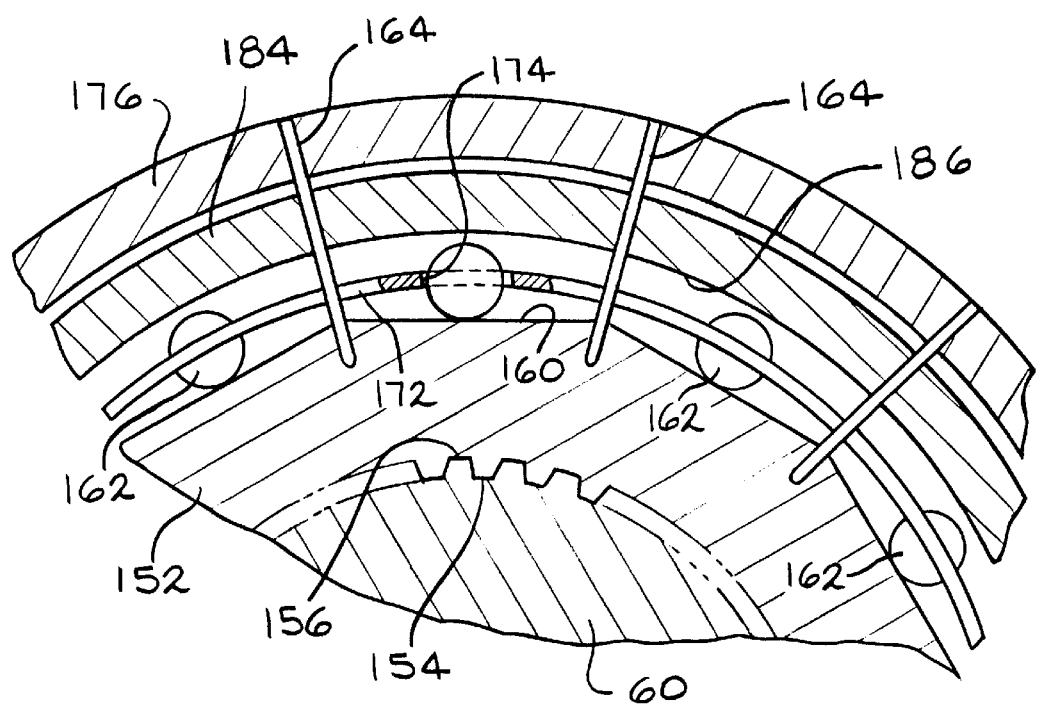
FIG. 4 is a full, sectional view of an acceleration sensitive double overrunning clutch according to the present invention taken along line 4—4 of FIG. 3.

An output member 180 includes a journal bearing surface 182 which engages a portion of the primary output shaft 60 and, thus, is freely rotatably supported thereupon. The output member 180 includes a stepped or enlarged diameter portion 184 having an internal surface 186 which is engageable by the clutch rollers 162. Specifically, the diameter of the internal surface 186 is such that when the clutch rollers 162 are disposed as illustrated in FIG. 4, at the nominal centers of the chordal flats or surfaces 160, there is clearance between the clutch rollers 162 and either the surfaces 160 on the internal surface 186. However, when the clutch rollers 162 move to positions away from the center of the chordal flats or surfaces 160, they will engage and be wedged into contact with both the flats or surfaces 160 and the internal surface 186 as will be more fully described subsequently.

The output member 180 also includes a plurality of chain drive teeth 188 which define a chain drive sprocket 190. Received upon the chain drive sprocket 190 is a drive chain 192. The chain drive sprocket 192 extends about and drivingly engages chain teeth 194 on a driven chain sprocket 196. The driven chain sprocket 196 includes a set of female or internal splines or gear teeth which engage a complementarily configured set of splines or gear teeth 202 formed in a secondary output shaft 204. The secondary output shaft 204 is supported upon a suitably disposed pair of anti-friction bearings such as ball bearing assemblies 206 and the secondary output shaft 204 is sealed within the housing assembly 50 by a suitable oil seal 208. The secondary output shaft 204 may include a flange 212 which forms a portion of one of the universal joints 44 or other mechanical components adapted to engage or drive components of the secondary drive line 30.

Preferably, the transfer case assembly 16 includes a geroter pump 220 which provides lubricating and cooling fluid through radial passageways 222 into an axial passageway 224 formed in the primary output shaft 60. The lubricating and cooling fluid is thus provided to various bearings and assemblies through ports 226 or other passageways.

In operation, the acceleration sensitive double overrunning clutch assembly 150 according to the present invention provides excellent operating characteristics, particularly engagement and disengagement. In operation at constant speed, the acceleration sensitive double overrunning clutch assembly 150 will be inactive. That is, assuming the speeds of the two drive lines are approximately equal and there is no acceleration or deceleration, there will be no mechanical input to the clutch assembly 150 that will tend to engage it. Even with a speed difference between the primary drive line 20 and the secondary drive line 30, that is, a condition where there is a finite and constant speed difference between the primary output shaft 60 and the output member 180 and associated components of the secondary drive line 30, the clutch assembly 150 will remain inactive and the vehicle will operate in two-wheel drive mode.

However, if the primary tire and wheel assemblies 28 suddenly lose traction and spin, this rapidly changing speed, i.e., acceleration, will cause rotation of the weight 176 relative to the drive annulus 152 and reposition the rollers 162 such that they will both engage and drive the secondary drive line 30 due to the speed difference. As the speed difference is overcome and accleration returns to pre-event levels, the rollers 162 will disengage. The double overrunning feature of the clutch assembly 150 achieves similar operation when the vehicle is operated in reverse and the primary tire and wheel assemblies 28 suddenly spin and accelerate due to a loss of traction.

It should be appreciated that due to the suspension of the weight 176 upon a plurality of radially disposed spring arms 164, it is also sensitive to deceleration. Such deceleration, which may occur in off throttle or other less frequently encountered situations, may also result in engagement of the clutch assembly 150.

It should also be appreciated that the specific spring rates of the spring arms 164 and the mass of the annular weight 176 will control the sensitivity of the clutch assembly 150, that is, establish the magnitude and duration of the accelerative or decelerative event which will cause staging or presetting of the rollers 162. Preferably, such sensitivity will be adjusted to provide optimum performance depending on such variables as vehicle weight, the torque and horse power of the engine, the frictional characteristics of the tires and other drive and handling considerations.

Finally, it should be noted that whereas the chordal flats or surfaces 160 which cooperatively achieve the wedging or engagement action of the rollers 162 with the internal cylindrical surface 186, the flats or chordal surfaces 160 may alternatively be disposed on the interior of the output member 180 and the drive annulus 152 may define a smooth, outer cylindrical surface.

Figure 5:
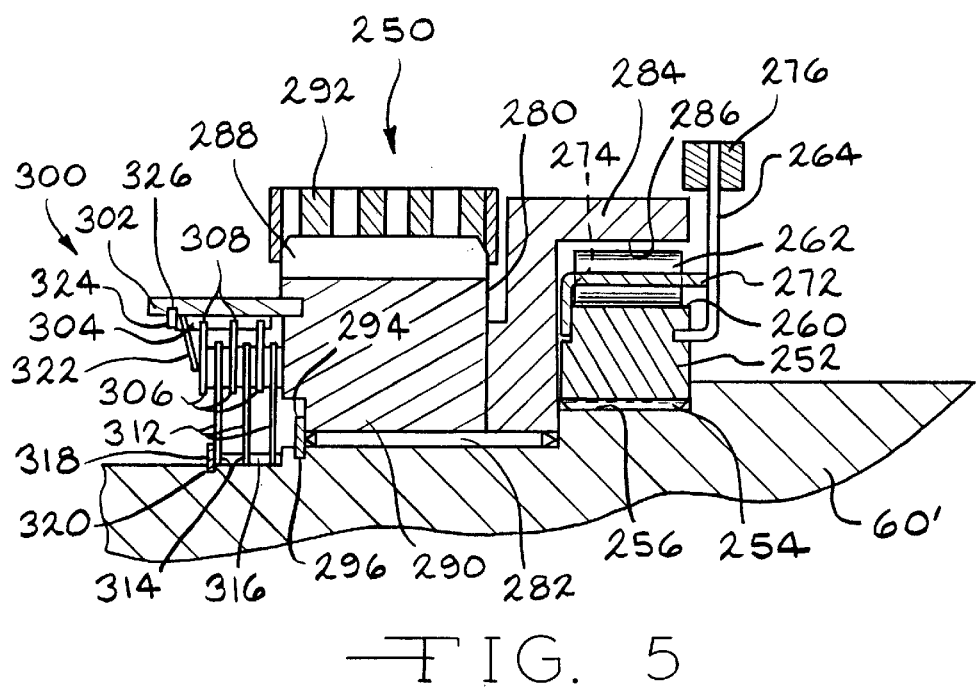
FIG. 5 is an enlarged, full sectional view of an alternate embodiment of an acceleration sensitive double overrunning clutch according to the present invention.

Referring now to FIG. 5, an alternate embodiment acceleration sensitive double overrunning clutch assembly is illustrated and generally designated by the reference number 250. The alternate embodiment clutch assembly 250 is similarly disposed upon a primary output shaft 60' of, for example, a transfer case assembly 16 illustrated in FIGS. 1 and 2. A drive annulus 252 includes a plurality of internal splines or gear teeth 254 which are drivingly received upon a complementarily configured plurality of male splines or gear teeth 256 on the primary output shaft 60. The drive annulus 252 defines a plurality of external chordal flats or surfaces 260 which are preferably each associated with a cylindrical clutch roller 262. Secured to the annular drive member 252 and rotating therewith are a plurality of radial spring arms 264. An axially and circumferentially extending roller cage 272 is secured to each of the spring arms 264. The roller cage defines an annulus having a diameter which nominally corresponds to the circle defined by the centers of the rollers 262. The roller cage 272 defines a plurality of rectangular openings 274 which receive and axially and circumferentially position each of the rollers 262. Secured to the outer termini of each of the spring arms 264 is an annular weight 276.

An output member 280 is freely rotatably supported upon the primary output shaft 60 either upon a journal bearing or upon an anti-friction bearing such as the roller bearing 282 illustrated. The output member 280 includes a stepped or enlarged diameter region 284 having an internal surface 286 which is engageable by the clutch rollers 262. The diameter of the internal surface 286 and its relationship to the size of the clutch rollers 162 and chordal surfaces 260 are described above with regard to the preferred embodiment clutch assembly 150.

The output member 280 also includes chain drive teeth 288 which define a chain drive sprocket 290. A drive chain 292 is received upon and drivingly engaged by the chain drive sprocket 290. The drive chain 292 drives the driven chain sprocket 196 illustrated in FIG. 2 and, in turn, the secondary drive line 30 illustrated in FIG. 1. A snap ring 294 seats within a complementarily configured circumferential channel 296 in the primary output shaft 60' and axially positions and retains the chain drive sprocket 290 and the alternate embodiment clutch assembly 250.

Adjacent the chain drive sprocket 290 and operably disposed between the chain drive sprocket 290 and the primary output shaft 60' is a friction clutch pack assembly 300. The friction clutch pack assembly 300 includes an axially and circumferentially extending annulus or sleeve 302 which may be integrally formed with or assembled to the chain drive sprocket 290. The cylindrical sleeve 302 includes a plurality of axially extending splines 304 on its inner surface. The splines 304 engage a first plurality of larger friction plates or discs 306 which include splines 308 which engage the splines 304 on the cylindrical sleeve 302. Interleaved with the first plurality of larger clutch discs 306 is a second plurality of smaller clutch discs 312 which include female splines 314 which engage complementarily configured male splines 316 on the primary output shaft 60'. The clutch discs 306 and 312 each include appropriate clutch friction material on adjacently opposed surfaces.

A snap ring 318 is received within a circumferentially channel or groove 320 in the primary output shaft 60' and retains the second plurality of clutch plates 312 thereon. A wave washer or Belleville spring 322 is disposed adjacent the interleaved plurality of clutch discs 306 and 312 and is retained thereagainst by a snap ring 324 received within a circumferential groove 326 in the cylindrical sleeve 302. The wave washer or Belleville spring 322 provides a biasing or compressive force to the clutch discs 306 and 312 thereby achieving a fixed and pre-selected degree of frictional coupling between the primary output shaft 60' and the chain drive sprocket 290. Thus, at all times, a certain preselected minimum coupling between the primary output shaft 60' and the chain drive sprocket 290 and thus between the primary drive line 20 and the secondary drive line 30 is achieved. Upon engagement of the clutch rollers 262, of course, the torque transferred through the double overrunning clutch assembly 250 increases above this minimum. The minimum torque coupling will vary depending upon the dynamic operating parameters of the vehicle and is preferably in the range of from 15 lbs·ft. to 50 lbs·ft. but may be from 10 lbs·ft. to 75 lbs·ft. depending primarily upon vehicle size, engine torque and other design and operational considerations.

If desired the drive annulus 252, the chain drive sprocket 290 and the annulus or cylindrical sleeve 302 may be high density powdered metal components which are fabricated and then assembled by furnace brazing into the device shown.

The foregoing disclosure is the best mode devised by the inventor for practicing this invention. It is apparent, however, that apparatus incorporating modifications and variations will be obvious to one skilled in the art of overrunning clutches. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A double overrunning clutch assembly for use in a motor vehicle drive line comprising, in combination, a first clutch member having a plurality of chordal surfaces, a second clutch member having a cylindrical surface disposed adjacent said chordal surfaces and defining an axis, a plurality of clutch rollers disposed between said clutch members, a cage disposed between said clutch members and receiving said rollers, at least one spring member secured to one of said clutch members and said cage and, a weight secured to said at least one spring member and disposed for movement about said axis relative to said one of said clutch members, whereby acceleration of said weight presets said rollers for overrunning operation.

2. The double overrunning clutch assembly of claim 1 wherein said first clutch member is a drive member and said second clutch member is a driven member.

3. The double overrunning clutch assembly of claim 1 wherein said second clutch member partially surrounds said first clutch member.

4. The double overrunning clutch assembly of claim 1 wherein said springs are secured to said first clutch member.

5. The double overrunning clutch assembly of claim 1 further including a chain drive sprocket operably coupled to one of said clutch members.

6. The double overrunning clutch assembly of claim 1 wherein said weight is moved relative to said one of said clutch members by acceleration and deceleration.

7. The double overrunning clutch assembly of claim 1 further including a transfer case having a primary output and a secondary output and wherein said first clutch member is operably coupled to said primary output and said second clutch member is operably coupled to said secondary output.

8. A double overrunning clutch assembly adapted for use in a motor vehicle drive line comprising, in combination, a plurality of clutch rollers disposed about an axis, a first clutch member having a plurality of chordal surfaces for receiving respective ones of said plurality of clutch rollers, a second clutch member having a surface spaced from said chordal surfaces, a cage having openings adapted to receive said clutch rollers, at least one spring member secured to one of said clutch members and said cage and, a weight secured to said at least one spring member and disposed for movement relative to said one of said clutch members about said axis, wherein acceleration of said weight in a first direction presets said rollers in a first position.

9. The double overrunning clutch assembly of claim 8 wherein said weight is an annulus.

10. The double overrunning clutch assembly of claim 8 wherein said first clutch member is a drive member and said second clutch member is a driven member.

11. The double overrunning clutch assembly of claim 8 further including a chain drive sprocket operably coupled to one of said clutch members.

12. The double overrunning clutch assembly of claim 8 wherein said springs are secured to said first clutch member.

13. The double overrunning clutch assembly of claim 8 wherein said cylindrical surface of said second clutch member substantially surrounds said chordal surface of said first clutch member.

14. The double overrunning clutch assembly of claim 8 further including a transfer case having a primary output and a secondary output and wherein said first clutch member is operably coupled to said primary output and said second clutch member is operably coupled to said secondary output.

15. A double overrunning clutch assembly adapted for use in a motor vehicle transfer case comprising, in combination, a first clutch member having a plurality of chordal surfaces, a second clutch member having a cylindrical surface spaced from said chordal surfaces, a clutch roller associated with each of said chordal surfaces, a circumferential cage having a plurality of openings adapted to receive a respective one of said clutch rollers and moveable between at least a first neutral position and a second engageable position, a plurality of springs secured to one of said clutch members and said cage and, a weight secured to said plurality of springs, wherein acceleration of said weight rotates said cage and said rollers from said first position to said second position.

16. The double overrunning clutch assembly of claim 15 wherein said first clutch member is a drive member and said second clutch member is a driven member.

17. The double overrunning clutch assembly of claim 15 further including a chain drive sprocket operably coupled to one of said clutch members.

18. The double overrunning clutch assembly of claim 15 wherein said springs are secured to said first clutch member.

19. The double overrunning clutch assembly of claim 15 further including a transfer case having a primary output and a secondary output and wherein said first clutch member is operably coupled to said primary output and said second clutch member is operably coupled to said secondary output.

20. The double overrunning clutch assembly of claim 19 wherein said transfer case further includes a speed reduction assembly having a first direct output, a second, reduced speed output and a clutch for selectively coupling one of said outputs to said primary output.

21. The double overrunning clutch assembly of claim 1 further including a plurality of radially oriented springs disposed between said one of said clutch members and said weight.

22. The double overrunning clutch assembly of claim 1 wherein said weight is annular and extends about said axis.

23. The double overrunning clutch assembly of claim 8 further including a plurality of radially oriented springs disposed between said one of said clutch members and said weight.

24. The double overrunning clutch assembly of claim 8 wherein said weight is annular and extends about said axis.

25. The double overrunning clutch assembly of claim 8 wherein acceleration of said weight in a second, opposite direction presets said rollers in a second, opposite position.

26. The double overrunning clutch assembly of claim 15 further including a plurality of radially oriented springs disposed between said one of said clutch members and said weight.

27. The double overrunning clutch assembly of claim 15 wherein said weight is annular and extends about said axis.

28. The double overrunning clutch assembly of claim 15 wherein said circumferential cage is moveable to a third engageable position and said clutch assembly provides overrunning in a first direction in said second engageable position and overrunning in an opposite direction in said third engageable position.

* * * * *